May 13, 1924.

C. B. HARRINGTON 1,494,306

MOTION PICTURE CAMERA

Filed Nov. 7, 1921

Inventor
C. B. Harrington.
By N. E. Dunlap.
Attorney

May 13, 1924.

C. B. HARRINGTON

MOTION PICTURE CAMERA

Filed Nov. 7. 1921

Inventor
C. B. Harrington.
By N. E. Dunlap
Attorney

May 13, 1924.  
C. B. HARRINGTON  
MOTION PICTURE CAMERA  
Filed Nov. 7, 1921  
1,494,306  
5 Sheets-Sheet 3

Inventor  
C. B. Harrington  
By N. E. Dunlap  
Attorney

C. B. HARRINGTON

MOTION PICTURE CAMERA

Filed Nov. 7, 1921

Inventor
C. B. Harrington
By N. E. Dunlap
Attorney

Patented May 13, 1924.

1,494,306

UNITED STATES PATENT OFFICE.

CLAUDE B. HARRINGTON, OF McMECHEN, WEST VIRGINIA, ASSIGNOR OF ONE-THIRD TO GLENN HARDMAN, OF McMECHEN, WEST VIRGINIA, AND ONE-SIXTH TO O. P. SCHEPP, OF PARKERSBURG, WEST VIRGINIA.

MOTION-PICTURE CAMERA.

Application filed November 7, 1921. Serial No. 513,344.

*To all whom it may concern:*

Be it known that I, CLAUDE B. HARRINGTON, a citizen of the United States of America, and resident of McMechen, county of Marshall, and State of West Virginia, have invented certain new and useful Improvements in Motion-Picture Cameras, of which the following is a specification.

This invention has relation to motion picture cameras, and it has for its primary object the production of a film camera in which the lens and film are together reciprocated by intermittent movements between two exposure positions or stations at which exposures are alternately effected, with the end in view to produce upon the film a series of pictures which, when projected, blend or dissolve to create a complete stereoscopic effect on the screen.

A further object is to provide an improved and practical construction of cinematographic camera whereby alternate pictures are taken from two separate horizontally alined angles so that when said pictures are projected in the ordinary manner the eye of the observer receives the impression of a single image viewed in binocular vision—that is, an accurate impression of relief and distance.

With these and other objects in view, the invention resides in the features of construction, arrangement of parts and combinations of elements which will hereinafter be exemplified, reference being had to the accompanying drawings, in which—

Figure 8 is a cross section of the structure shown in Fig. 7;

Referring to said drawings, 1 indicates a box-like casing within the rear end of which are mounted as ordinarily, two rectangular magazines 2 and 3 in which are mounted reels 4 and 5 upon which is wound the usual film 6.

Extending transversely into the casing through the rear side wall 1$^a$ of the latter is a longitudinally movable rotary shaft 7 which has loosely mounted thereon a carriage comprising a pair of relatively spaced supporting members 8. While said shaft is rotatable with respect to said carriage, the latter is shiftable therewith, as will hereinafter be explained. Additionally supporting said carriage are two stationary transverse guide-rods 12 upon which said members are slidable, said rods having their opposite ends rigidly mounted, as in the opposite side walls of the casing.

Attached to and rigidly supported by the members 8 of the carriage are two transversely disposed plates 9 and 10 which are arranged vertically to provide therebetween an enclosed narrow passage or throat 11 which constitutes a vertical guideway for the film 6. Said plates are additionally supported by and are slidable upon guide-rods 12$^a$ similar to the rods 12, said plate 10 having apertured lugs 13 slidably mounted upon said rods. Said plates 9 and 10 have registering film-exposing openings 9$^a$ and 10$^a$ therein in alinement with the projection passage of a lens tube or barrel 14 which constitutes a part of a camera, said tube having its inner end rigidly mounted upon and being carried by said film guide. Said tube 14 projects outward through an opening 15 which is provided therefor in the front end 1$^b$ of the casing and which has a width materially greater than the diameter of said tube to provide for unobstructed lateral shifting movement of the latter for positioning the lens portion of the camera alternately at two separated exposure positions located a predetermined distance apart, as approximately one inch. To provide for such shifting movement of the camera, and at the same time to prevent access of light to the interior of the casing through said opening 15, a bellows-like covering 16 of pliable light-excluding material, as leather, is interposed between said tube and the casing walls which encircle said opening.

Provided in the opposite lateral edge portions of the guide plate 9 are vertical slots 17 through which extend prongs or teeth 18 carried peripherally upon opposite disk-like end portions of a spool-like cylinder 19 which is fixed upon the shaft 7 between and with its said end portions in abutting relation to the supporting members of the carriage. Said teeth are adapted, upon rotation of said shaft, to engage the usual perforations in the film for advancing the latter through the guideway 11, and, since the film must have a step-by-step travel, it follows that the rotation of the shaft 7 by which said cylinder is carried must be intermittent and that each rotary movement must carry said cylinder throughout a definite part of a revolution. The actuating mechanism by means of which the longitudinal reciprocation and the intermttent rotary movements of the shaft 7 are effected will hereinafter be described.

Extending transversely through the casing 1 and suitably journaled, as in the opposite side walls, is a drive-shaft 20 whch carries upon the outer end thereof a hand-crank 21 by means of which it may be rotated. Fixed upon said drive-shaft is a large gear wheel 22 which is permanently in mesh with a small gear wheel or pinion 23 carried by a shaft 24 which extends outward through the rear wall 1ᵃ of the casing and is journaled in bearings provided therefor in said wall and on a cross member 25ᵃ constituting part of a cast metal frame 25 that is disposed within a suitable gear-case 26 which is attached to and carried by said rear side wall adjacent to the front end of the casing. Carried upon the outer end of said shaft 24 is a bevel gear 27 which is disposed in driving relation to a similar gear 28 carried by a shaft 29 journaled on the sides of said frame 25. Fixed on said shaft 29 is a pin wheel 30 which constitutes the driving member of an intermittent gearing, said driving member or wheel cooperating with a Geneva cross or gear 31 fixed upon a crank-shaft 32 located over and parallel to said shaft 29 for rotating said shaft 32 throughout a definite part of a revolution in one revolution of said driving member. As herein shown, two arcuate sections 33 and 34 of a cam-band are provided on a face of said driving member, the same being separated by blank spaces in which are located pins or studs 35 and 36 designed to enter radial slots 37 provided in the driven gear when said cam-band sections ride off the concave surfaces of said gear. Four equi-spaced slots 37 are provided in the gear 31, and the studs 35 and 36 of the driving gear are spaced ninety degrees apart. Thus, as is manifest, two successive quarter rotations are imparted to the driven gear 31 and the crank-shaft 32, said movements being initiated at points ninety degrees apart, in each complete revolution of the driving wheel 30.

Said crank-shaft 32 has the crank thereof connected by a connecting-rod or pitman 38 to a crosshead 39 which has its ends slidably mounted upon guide rods 40 that are stationarily mounted in appropriate positions parallel to the shafts 7, 20 and 24. Said crosshead is slotted longitudinally, and closely fitted in the slot 41 thereof is a Geneva cross 42 which constitutes the driven member of an intermittent gearing by means of which intermittent rotary movements hereinbefore referred to are communicated to the shaft 7 for effecting the advance, through the cylinder 19, of the film 6. Said cross or driven gear 42 is mounted centrally upon the outer end of said shaft 7 which projects through the inner wall of said crosshead into the slot 41. The driving member of the intermittent gearing which includes said driven gear 42 comprises a hollow cylinder 43 fixed upon the constantly driven shaft 24, the latter being located under and in vertically alined relation to said shaft 7. Said cylinder 43 has therein a longitudinally extending slot 44 of suitable width, and rigidly carried by said cylinder in longitudinal bisecting relation to said slot is a small stationary rod 45 which, in each revolution of the cylinder, enters one of four equispaced radial slots 46 of the driven member 42 and effects rotation of the latter throughout a quarter revolution for driving said shaft 7 and, consequently, the film-advancing cylinder 19 throughout a corresponding portion of a revolution, said cylinder 19 being of such size that such portion of a revolution effects movement of the film throughout the distance required to properly present the latter for successive exposures.

From the foregoing it will be understood that continuous rotation of the drive-shaft 20 produces, through gears 22 and 23, like rotation of shaft 24, and that such rotation of the latter produces, through bevel gears 27 and 28, like rotation of the shaft 29. With each revolution of said shaft 29, the crank-shaft 32 is actuated through the intermittent gear members 30 and 31, to rotate in two successive movements of one-fourth revolution each throughout one-half revolution, whereby, as will hereinafter be described, the shaft 7 is shifted longitudinally for presenting the camera and the film 6 at one of two horizontally alined relatively spaced exposure positions. Further, at each revolution of the shaft 24 the shaft 7 is actuated, through the intermittent gear members 42 and 43, to rotate throughout one-fourth revolution, whereby is effected the advance travel of the film 6 throughout a definite distance.

It will be understood that the driven member 42 of the last above-mentioned gearing slides longitudinally over or along the surface of the driving member 43 when the crosshead 39 is reciprocated as aforesaid; also that said driving member is of such length that it is operatively related to the driven member at each of the opposite limits of movement of the latter.

Bolted to an annular flange formed on the outer end of the lens tube or barrel 14 of the camera, with an interposed apertured circular disk or washer 47, is a plate 48 having an aperture 49 registering with, but of smaller diameter than, the projection passage of said lens tube. Also bolted in turn to said plate 48 are the outer ends of a plurality of spider-like arms 50ᵃ of a socket-piece 50 within which is fitted the usual holder 51 by which the camera lens 52 is carried. Said socket-piece has an aperture 53 in its inner end registering with the aperture 49 of said plate 48. The body of said socket-piece is spaced away from said plate 48 to provide an intermediate space in which is closely fitted the body portion of a shutter 54 designed for shifting movement into and out of a position in which a slightly oblong opening 55 therein is disposed in register with the alined concentric openings 49 and 53 to permit exposure of the length of film which occupies a position between the openings 9ᵃ and 10ᵃ of the film guide.

The shutter 54 has an upright arm 56 which, at a point above the upper edge of the plate 48, is pivotally mounted upon the upper end of a lever 57 which is mounted for oscillatory movement on the circular disk or washer 47, said lever having intermediate its ends a circular ring-like formation 57ᵃ which embraces the periphery of said washer. The lower end portion of said lever has therein a short longitudinal slot 58 through which extends a headed pivot-pin 59 mounted in or on the outer end of a post 60 carried by the front wall 1ᵇ of the casing at a suitable point.

The shutter 54 has a depending arm 61 upon the lower end of which is mounted, as by means of a screw 62, an adjustable extension member 63. Pivotally attached to the lower end of said member is one end of a bar or pitman 64 which has its opposite end pivotally connected to a crank-arm 65 mounted upon the end of the shaft 29 which projects outward through a side of the gear-case 26. Said extension member 63 is adapted for adjustment with respect to the shutter-arm 61 upon which it is mounted to regulate the length of the intervals of film exposure, as will hereinafter be explained. An adjusting screw 66 is provided for securing said member in adjusted position, the same being directed into said arm 61 through a slot 67 provided in said member. A pointer 68 on the shutter-arm 61 is associated with graduations on a head 63ᵃ formed on said member for indicating the degree of angularity of the latter with respect to said shutter-arm.

Since rotation of the shaft 29 is continuous during operation of the machine, it is manifest that the shutter 54 is subjected, through the crank-arm 65 and the pitman 64, to continuous oscillation and that complete forward and return oscillatory movements are made by said shutter with each revolution of said shaft. Also, as hereinbefore described, during each revolution of said shaft 29, the crank-shaft 32 is actuated to rotate throughout a half revolution. In said half revolution, the camera is actuated through the intermediate mechanism to move from one limit of movement to the other, following which said camera remains at rest during the remainder of the revolution of said shaft 29. Then, on the next revolution of said shaft, the crank-shaft is again actuated to rotate throughout a half revolution, in which the camera is moved to the opposite limit of its travel, where it remains stationary, or at rest, during the remainder of the revolution of said shaft.

Figure 1:
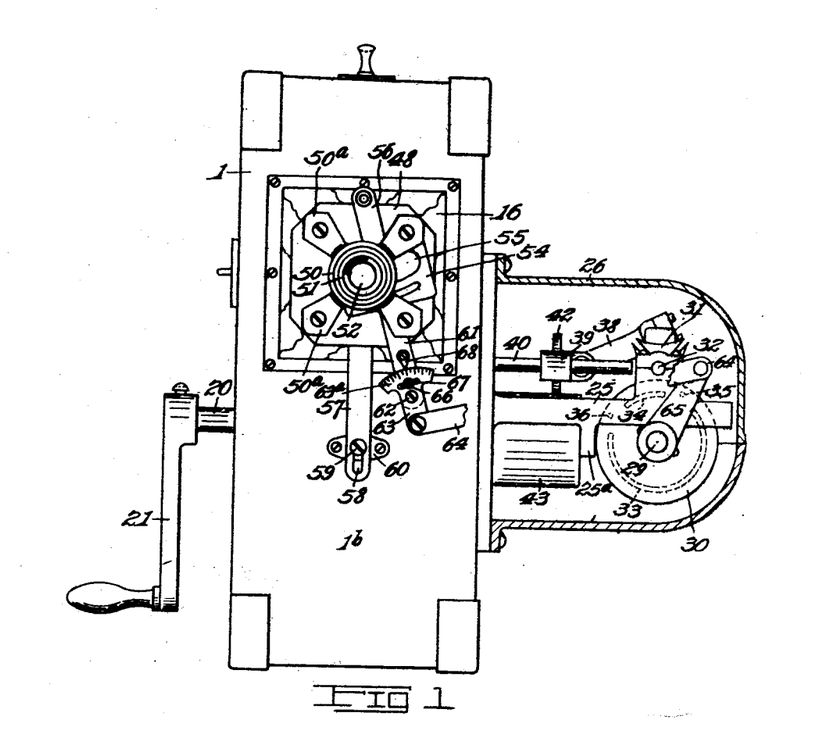
Figure 1 is a view of the apparatus partly in front end elevation and partly in sectional elevation.
Figure 2:
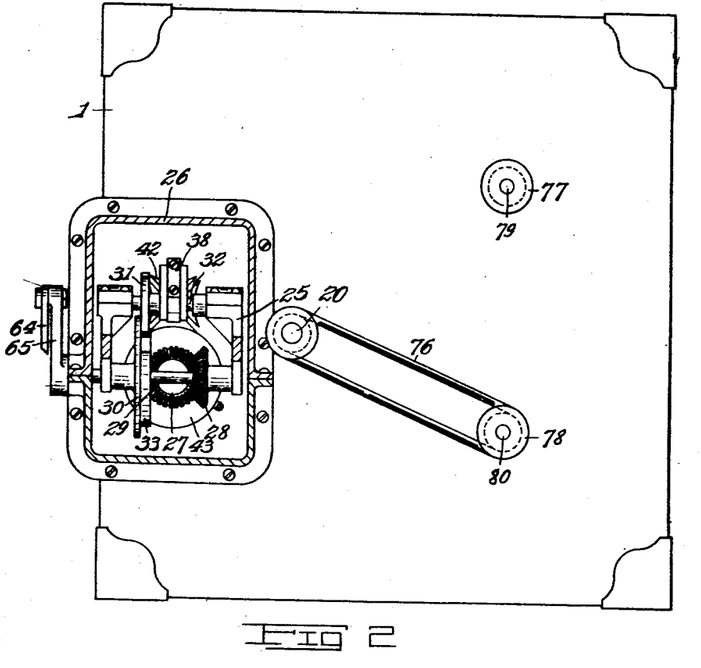
Figure 2 is a view partly in rear side elevation and partly in sectional elevation.
Figure 3:
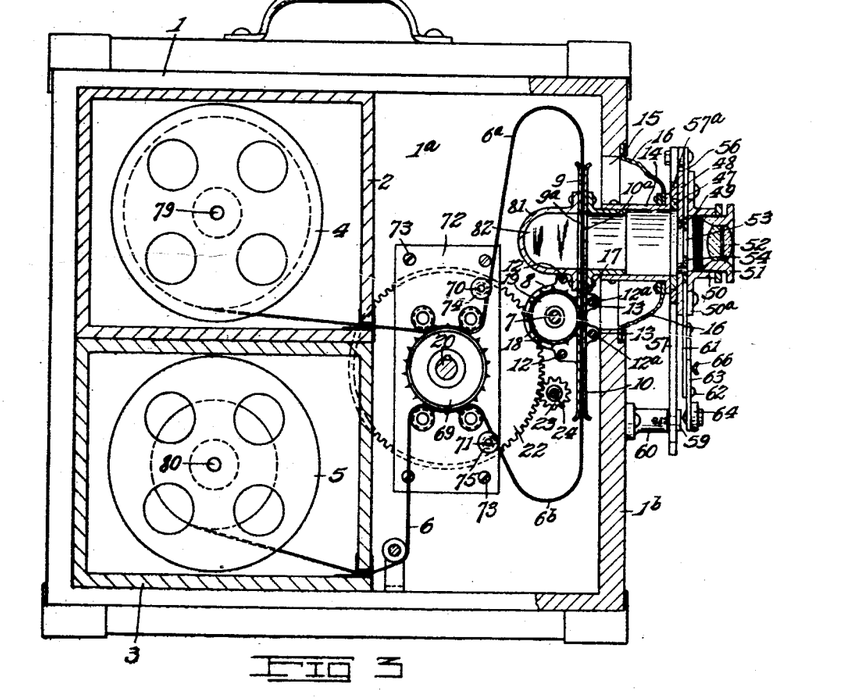
Figure 3 is a vertical longitudinal section.
Figure 4:
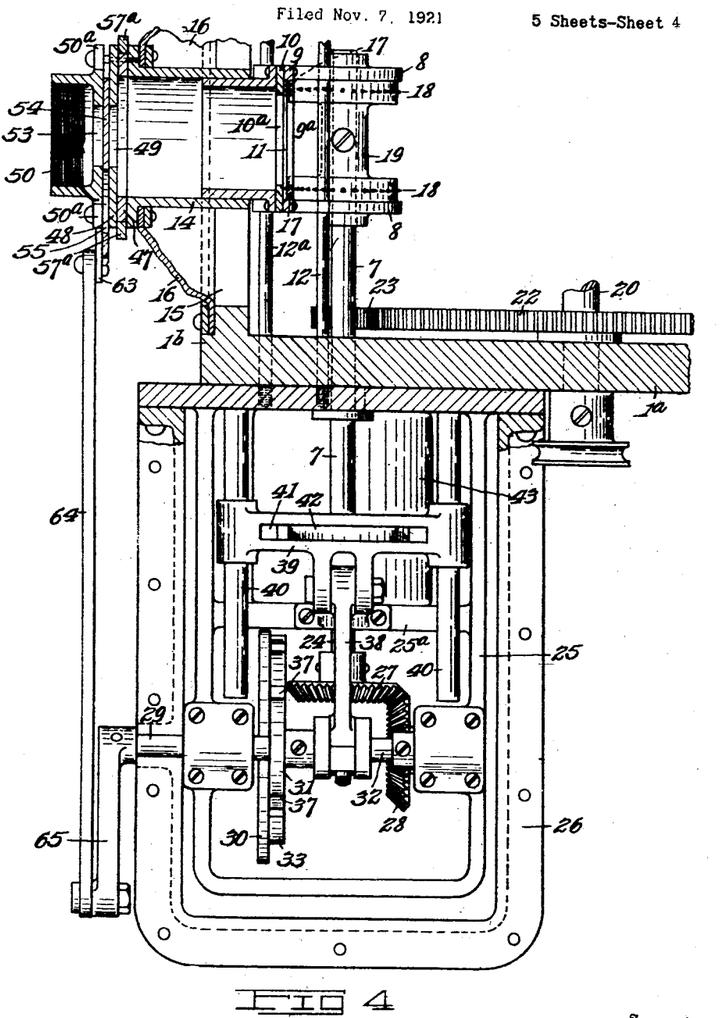
Figure 4 is an enlarged fragmentary horizontal section.
Figure 5:
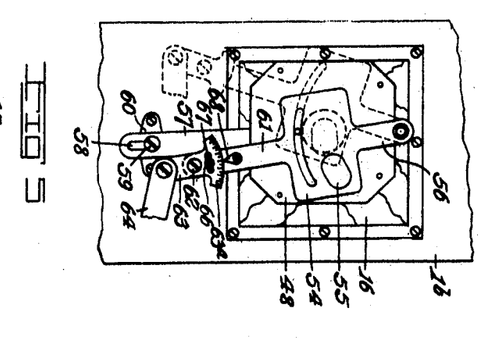
Figure 5 is a partial front end elevation with the lens and lens-socket removed, illustrating the operation of the shutter when the camera occupies one limit of its movement.
Figure 6:
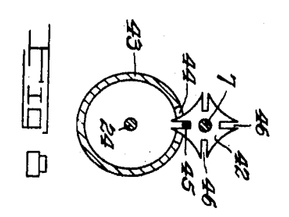
Figure 6 is a similar view illustrating the operation of the shutter when the camera occupies the opposite limit of its movement.
Figure 7:
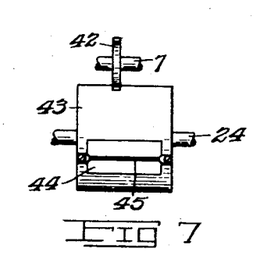
Figure 7 is an elevation of the intermittent gearing by which advance movement of the film is effected.
Figure 9:
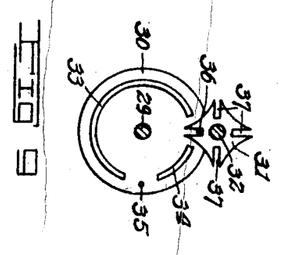
Figures 9 and 10 are elevations of the intermittent gearing by which reciprocating movements of the camera are effected.
Figure 10:
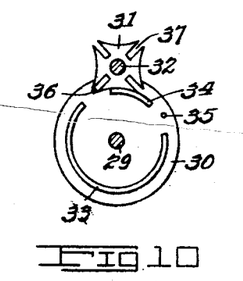
Figure 11:
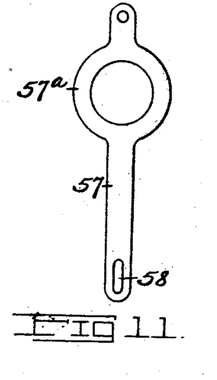
Figure 11 is an elevation of the oscillating lever, detached.
Figure 12:
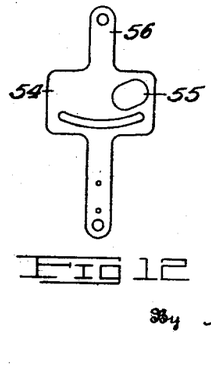
Figure 12 is a similar view of the shutter; and—
Figure 13:
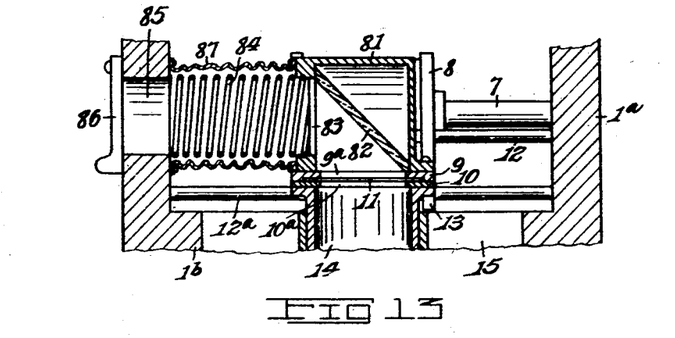
Figure 13 is an enlarged horizontal detail section of the film guide and the means by which the length of film occupying exposure position may be inspected.

Assuming that the various parts of the mechanism have just reached the position in which the camera is disposed at the left hand limit of its shifting movement, shown in Fig. 5, further rotation imparted to the shaft 29 effects movements as follows: During the next quarter revolution of said shaft the shutter 54 is swung from its passage-closing position shown in full lines in Fig. 5 to the dotted line position shown in said figure, in which the opening 55 thereof registers with the axially alined openings 49 and 53 to permit exposure of the length of film which is then disposed between the openings 9ᵃ and 10ᵃ of the film guide. During the next succeeding quarter revolution of said shaft the shutter is returned to the full line position shown in said figure. During the next, or third, quarter revolution of said shaft the camera is actuated to move from the left hand position shown in Fig. 5 to the central position shown in Fig. 1, and at the same time the film is advanced to present between the openings 9ᵃ and 10ᵃ the next succeeding length thereof. During the fourth quarter revolution of said shaft the camera is shifted from said central position to the right-hand limit of its travel, shown in Fig. 6, and at the same time the shutter is swung to the sub-
stantially vertical position shown in full lines in said figure, in which position it still remains in closing relation to the projection passage. During the first quarter of the next revolution of said shaft said shutter
moves from the full line position to the dotted line position in Fig. 6, presenting its opening 55 in registering film-exposing position. During the next quarter revolution of the shaft said shutter is returned to the
full line position shown in Fig. 6. During the next, or third, quarter of the second revolution of said shaft said shutter is further swung to the right, and at the same time the camera is shifted from the right-
hand position shown in Fig. 6 to the central position shown in Fig. 1, and the film is advanced to present a new length in position for exposure; and in the final quarter of the second revolution of said shaft the
camera is returned to the initial position shown in Fig. 5.

It will be observed that, in order to provide for the requisite shifting of the shutter, as aforesaid, without hindrance from
or to the travel of the camera, and at the same time in order to maintain said shutter at all times in proper operative relation to said camera, it is essential that said shutter shall be pivotally carried by a pivoted mem-
ber, as the lever 57, which has oscillating movement on or with respect to the camera during travel of the latter.

Through adjustment of the member 63 on the shutter-arm 61 the distance throughout
which the shutter is swung in the opening or film-exposing movements thereof, and, consequently, the duration of the interval of exposure are regulated, it being understood that the opening 55 in the shutter is
of oblong form so that, following initial opening of the projection passage for allowing film exposure, additional travel of said shutter is permitted in the direction of the opening movement without in any way
obstructing said passage.

Step by step advance of the film 6 is effected without subjecting the film to strains or undue jerks which might result in injury thereto, upper and lower loops 6ª and 6ᵇ
being provided in said film intermediate the carriage and a feed drum 69 carried by the drive shaft 20, said drum being of a usual type having sprocket teeth for engagement with the perforations of the film and being
adapted to carry the film from and to the reels 4 and 5 at a substantially uniform rate of speed. To constantly maintain those portions of the film which are immediately adjacent to said drum in direct alinement with
the latter, so that proper feeding thereof may not be affected by the shifting movements of the portions constituting said loops as the film-guide is reciprocated, as aforesaid, suitable guide members are provided
adjacent to said drum. As herein shown for illustrative purposes, said guide members comprise two outstanding rods 70 and 71 having their inner ends stationarily mounted in a supporting bracket or plate 72 which
is carried by posts 73 mounted in the rear side wall of the casing, said rods being located slightly forward of said drum and above and below, respectively, the path of travel of the film in passing to and from
the film guide. Collars 74 and 75 carried on the outer ends of said rods 70 and 71, respectively, are constantly engaged by the outer edge of the film and serve to prevent outward shifting movement of the portions
of the latter which are disposed between them and the drum.

Located on the drive shaft 20, preferably on an end thereof which projects outward through the side 1ª of the casing, is a pulley
which is designed, according to the direction of travel desired for the film, to be connected by a belt 76 to one or the other of two pulleys 77 and 78 carried on the projecting spindles 79 and 80, respectively, upon which
the reels 4 and 5 are mounted for effecting winding of said film.

Rigidly mounted upon the rear face of the plate 9 of the film guide in enclosing relation to the opening 9ª thereof is a small
box 81, and disposed vertically within said box in a diagonally extending position is a small mirror 82. Attached to a side of said box and encircling an opening 83 in the side of the same is one end of a light
coil spring 84 which has its opposite end attached to the front side wall of the casing 1 in encircling relation to a sight opening or port 85 which is normally closed, as by a swinging shutter 86. Also disposed in
enclosing relation to the spring 84 is an extensible tube 87 of a pliable light-excluding material, as leather or fabric. Said tube 87, with the openings 83 and 85, constitutes a passage through which may be viewed on the
mirror 82 the deflection of the picture borne by the length of film located in exposing position in the film guide; and the spring 84 constitutes a supporting frame by which collapse of the tube into vision-obscuring po-
sition is prevented. Due to the great flexibility and lightness of said spring, the latter readily extends and collapses with the reciprocating movements of said film guide.

The gear case 26 is composed, preferably, of two interfitting parts, as shown, and is designed as a container for oil in which said gears work and by which they are lubricated.

What is claimed is:—
1. A motion picture machine comprising a film camera, a constantly rotated shaft, means intermediate said shaft and said camera and actuated by the former whereby the latter is intermediately reciprocated between two definitely related exposure positions, automatic means for effecting film exposure at each of said positions, and intermittent gearing whereby the film is advanced following exposure and prior to the next reciprocating movement of the camera, said intermittent gearing including driving and driven members, the former comprising a continuously driven apertured cylinder and the latter a Geneva cross carried by the camera-reciprocating means and engageable in the apertures of the cylinder, said cross being slidable longitudinally along the surface of said cylinder.

2. A motion picture machine comprising a film camera, a constantly rotated shaft, means intermediate said shaft and said camera and actuated by the former whereby the latter is intermittently reciprocated between two definitely related exposure positions, automatic means for effecting film exposure at each of said positions, and intermittent gearing whereby the film is advanced following exposure and prior to the next reciprocating movement of the camera, said intermittent gearing including driving and driven members, the former comprising a continuously driven cylinder and the latter a Geneva cross carried by the camera-reciprocating means, said cylinder being provided with means engageable with said cross whereby the latter is rotated at intervals, said cross being movable along said cylinder during reciprocation of said camera.

3. A motion picture machine comprising a film camera, a constantly rotated shaft, means intermediate said shaft and said camera and actuated by the former whereby the latter is intermittently reciprocated between two definitely related exposure positions, automatic means for effecting film exposure at each of said positions, and intermittent gearing whereby the film is advanced following exposure and prior to the next reciprocating movement of the camera, said intermittent gearing including driving and driven members, the former comprising a continuously driven cylinder and the latter a Geneva cross carried by the camera-reciprocating means, said cylinder having therein a longitudinal slot and having a member disposed in bisecting relationship to said slot for engaging said cross, said cross being movable along said cylinder during reciprocation of said camera.

4. A motion picture machine comprising a film camera, means for intermittently reciprocating said camera between two exposure positions, means for effecting film exposure at each of said positions, and intermittent gearing for advancing the film between exposures, said gearing including a constantly rotated cylinder and a Geneva cross, said cylinder being provided with means engageable with said cross for rotating the latter, said cross carried by and movable with said camera-reciprocating means and having sliding movement on said cylinder.

5. A motion picture machine comprising a film camera, means for intermittently reciprocating said camera between two exposure positions, means for effecting film exposure at each of said positions, and intermittent gearing for advancing the film between exposures, said gearing including a constantly rotated cylinder and a Geneva cross, said cylinder having therein a longitudinal opening and having a member in said opening engageable with said cross for rotating the latter, said cross being carried by said camera-reciprocating means and being slidable upon the surface of said cylinder.

6. A motion picture machine comprising a film camera, a film guide in fixed relation to said camera, mechanism for intermittently reciprocating said camera and said guide between two exposure positions, said mechanism including intermittent gearing, means for effecting film exposure at each of said positions, and intermittent gearing for advancing the film between exposures, said gearing comprising a constantly rotated driving member and a cooperating driven member, said members having interengageable means whereby rotary motion is communicated from one to the other, the driven member, being reciprocable over the surface of said driving member in the reciprocating movements of said camera-reciprocating mechanism and being maintained against rotation by said driving member in said reciprocating movements.

7. A motion picture machine comprising a film camera, means for intermittently reciprocating said camera between two exposure positions, said means comprising a constantly rotated element, means for intermittently advancing the film following exposure at each of said positions, a pivoted and bodily shiftable swinging shutter normally closing the projection passage of the camera, said shutter being movable into passage-opening position at each of said exposure positions, and means connecting said shutter with said constantly rotated element whereby the formed is actuated.

8. A motion picture machine comprising a film camera, means for intermittently reciprocating said camera between two exposure positions, means for intermittently advancing the film following exposure at each of said positions, a pivoted shutter associated with said camera and movable into and out of opening relation to the projection passage of the latter at each of said exposure positions, said shutter being arranged for bodily shifting as well as swinging movements.

9. A motion picture machine comprising a film camera, means for intermittently reciprocating said camera between two exposure positions, means for intermittently advancing the film following exposure at each of said positions, a lever carried by and having oscillating movement on said camera during reciprocating movements of the latter, and a shutter pivotally mounted on said lever and movable into and out of opening relation to the projection passage of the camera whereby exposure of the film is effected at each of said exposure positions.

10. A motion picture machine comprising a film camera, means for intermittently reciprocating said camera between two exposure positions, means for intermittently advancing the film following exposure at each of said positions, said intermittent reciprocating means comprising a constantly rotated element, a lever carried by and having oscillating movement on said camera during reciprocating movements of the latter, a shutter pivoted upon said lever and movable across the projection passage of the camera, and a pitman intermediate said constantly rotated element and said shutter whereby the latter is swung into and out of opening relation to said passage at each of said exposure positions.

11. A motion picture machine comprising a film camera, means for intermittently reciprocating said camera between two exposure positions, means for intermittently advancing the film following exposure at each of said positions, said intermittent reciprocating means comprising a constantly rotated element, a lever mounted intermediate its ends upon said camera and movable therewith, said lever having one end pivoted upon a stationary part whereby oscillatory movement thereof is produced during reciprocating movement of the camera, a shutter pivotally mounted upon the opposite end of said lever, and a pitman connecting said constantly rotated element to said shutter for actuating the latter to and from opening relation to the projection passage of said camera at each of said exposure positions.

In testimony whereof, I affix my signature in presence of two subscribing witnesses.

CLAUDE B. HARRINGTON.

Witnesses:
S. BOYER,
H. E. DUNLAP.